(12) United States Patent
Dayaram (10) Patent No.: US 11,508,271 B2
(45) Date of Patent: Nov. 22, 2022

(54) DISPLAY PANEL

(71) Applicant: CAPTIVE 8 MEDIA LIMITED, Hong Kong (HK)

(72) Inventor: Dinesh Mukesh Dayaram, Hong Kong (HK)

(73) Assignee: CAPTIVE 8 MEDIA LIMITED, Hong Kong (HK)

( * ) Notice: Subject to any disclaimer, the term of this patent is extended or adjusted under 35 U.S.C. 154(b) by 85 days.

(21) Appl. No.: 17/044,760

(22) PCT Filed: Apr. 10, 2019

(86) PCT No.: PCT/CN2019/082009
§ 371 (c)(1),
(2) Date: Oct. 1, 2020

(87) PCT Pub. No.: WO2019/196854
PCT Pub. Date: Oct. 17, 2019

(65) Prior Publication Data
US 2021/0027676 A1 Jan. 28, 2021

(30) Foreign Application Priority Data
Apr. 11, 2018 (HK) .................... 18104748.7

(51) Int. Cl.
| | | |
|---|---|---|
| G09F 21/04 | (2006.01) |
| G06F 3/14 | (2006.01) |
| G06F 3/147 | (2006.01) |
| G01P 3/00 | (2006.01) |
| G01S 19/52 | (2010.01) |
| G09F 9/33 | (2006.01) |

(Continued)

(52) U.S. Cl.
CPC ............ *G09F 21/042* (2020.05); *G06F 3/147* (2013.01); *G06F 3/1423* (2013.01); *G09F 21/04* (2013.01); *G01P 3/00* (2013.01); *G01S 19/52* (2013.01); *G09F 9/33* (2013.01); *G09F 9/35* (2013.01); *G09F 11/30* (2013.01); *H04M 1/0202* (2013.01)

(58) Field of Classification Search
CPC .......... G09F 21/042; G09F 21/04; G09F 9/33; G09F 9/35; G09F 11/30; G06F 3/1423; G06F 3/147; G01P 3/00; G01S 19/52; H04M 1/0202
USPC ......................................................... 345/1.1
See application file for complete search history.

(56) References Cited

U.S. PATENT DOCUMENTS

| | | | | |
|---|---|---|---|---|
| 9,607,510 B1 * | 3/2017 | DeLorean | ................ | G08G 1/02 |
| 10,762,809 B1 * | 9/2020 | DeLorean | .............. | G08G 1/042 |

(Continued)

FOREIGN PATENT DOCUMENTS

| | | |
|---|---|---|
| CN | 102074121 A | 5/2011 |
| CN | 103794152 A | 5/2014 |

(Continued)

OTHER PUBLICATIONS

Foreign Communication from a Related Counterpart Application, International Search Report and Written Opinion dated Mar. 8, 2018, International Application No. PCT/SG2017/050610 filed on Dec. 11, 2017.

*Primary Examiner* — Tom V Sheng (57) ABSTRACT

An information panel or display panel suitable for mounting onto the top of a vehicle is disclosed. Information such as advertisement can be change automatically. Change of advertisement content is responsive to the speed of the vehicle.

13 Claims, 10 Drawing Sheets

(51) Int. Cl.
  *G09F 9/35*   (2006.01)
  *H04M 1/02*   (2006.01)
  *G09F 11/30*  (2006.01)

(56) References Cited

U.S. PATENT DOCUMENTS

| | | | |
|---|---|---|---|
| 2006/0213100 A1* | 9/2006 | McCann | G09F 21/04 |
| | | | 40/591 |
| 2015/0294363 A1 | 10/2015 | Bhola et al. | |
| 2017/0177957 A1* | 6/2017 | Yokochi | G06V 20/582 |
| 2020/0090562 A1* | 3/2020 | DeLorean | G09F 19/22 |
| 2021/0174714 A1* | 6/2021 | DeLorean | G09F 21/04 |
| 2021/0233442 A1* | 7/2021 | DeLorean | G09F 27/005 |

FOREIGN PATENT DOCUMENTS

| | | |
|---|---|---|
| CN | 205104200 U | 3/2016 |
| CN | 106327241 A | 1/2017 |
| JP | 2014174493 A | 9/2014 |
| WO | 2019196854 A1 | 10/2019 |

\* cited by examiner

DISPLAY PANEL

CROSS-REFERENCE TO RELATED APPLICATIONS

The present application is a filing under 35 U.S.C. 371 as the National Stage of International Application No. PCT/CN2019/082009, filed Apr. 10, 2019, entitled "A DISPLAY PANEL," which claims priority to Hong Kong Application No. 18104748.7 filed with the Intellectual Property Office of Hong Kong on Apr. 11, 2018 and entitled "A DISPLAY PANEL," both of which are incorporated herein by reference in their entirety for all purposes.

FIELD OF INVENTION

The present invention relates to mobile information panels. In particular, the present invention relates to information panels which can be installed onto vehicles or similar moving carriages.

BACKGROUND OF THE INVENTION

The advertisement industry is bigger than ever before because ready availability of means to mass manufacturing has steepened competition in the marketplace. Businesses nowadays have to vie for attention of consumers using far-reaching advertisement channels to ensure profits.

Conventionally, businesses rely mainly on printed material such as posters and leaflets to carry advertisements. Locations for putting up particular posters can be chosen according to the people who are likely to be found in those locations and whether they are the target audience for the advertisements. However, in densely populated locations, there is often limited wall space for mounting posters. To overcome this limitation, the sides of taxis, buses and other moving vehicles have been used and printed on as advertisement space.

It has been proposed to install advertisement panels onto the top of taxis to provide yet more advertisement space. The façade of these panels can be plastered with a poster. A light source is provided within these panels, and the illumination allows people to read the poster at night. However, taxis are mobile and travel randomly within specific areas. Advertisements selling effectively to people in one location may not achieve the same result with people in another location. If a taxi is driven through a location wherein the relevance of the displayed advertisement is low to the people there, the business would be paying for ineffectual advertisement.

It has also been proposed to provide wall-mounted multiple-content panels which display changing advertisements. These panels show an advertisement in one moment and another advertisement in another moment, in regular intervals. Unfortunately, these panels are sometimes even less effective than conventional posters because an advertisement can be replaced before passing pedestrians could appreciate the content of the advertisement fully.

Therefore, it is desirable to propose apparatuses or methods which could possibly improve the efficiency of advertisements carried by vehicles and mitigate or reduce the aforementioned problems.

SUMMARY OF THE INVENTION

In the first aspect, the invention proposes a display panel comprising a screen, the display panel configured to display content on the screen; wherein the display panel is responsive to the speed in which the display panel is moving to vary the content displayed on the screen.

Varying includes varying the content or type of contents shown on the screen, or varying the period between two contents shown.

Preferably, the display panel is configured to display a plurality of contents on the screen in intervals, and the display panel is configured to respond to the speed to vary the length of the intervals between successive displays of the plurality of contents.

As technology improves and businesses demand more effectiveness in their advertisement campaigns, there are some pain points in dynamic content advertising that can be resolved by synchronizing content change with the speed in which the display panel is being moved. The invention provides the possibility of improving the effectiveness of multiple advertisements displayed on the screen of a display panel, by using speed as a factor to determine the moment for changing the advertisement in display. Hence, advertisement space provided by the display panel is optimised. The display panel may be configured such that advertisements which may be more effectively remembered by the audience after prolonged viewing are shown when the display panel is moving at a lower speed. Conversely, if the display panel is moving in a higher speed, a simpler and easily remembered advertisement may be shown instead.

More preferably, the display panel comprises an integral accelerometer arranged to monitor the speed of the display panel, such that the accelerometer supplies information based on the movements of the display panel.

If the display panel is mounted onto a vehicle, the accelerometer in the display panel is able to read the acceleration of the vehicle indirectly. The acceleration can be translated into velocity of the vehicle. Having the accelerometer integral with the display panel makes production, installation and use of the display panel easier, as there is no need of an independent, separate accelerometer in the vehicle.

Typically, the display screen is configured to be mounted to the top of a vehicle or to a side of a vehicle. Accordingly, the invention provides the possibility of curating advertising and digital signage displays based on the speed of a moving vehicle.

Optionally, the display panel further comprises a receiver capable of receiving information on the speed in which the display panel is moving; wherein the receiver is configured to receive information on the speed in which the display panel is moving from a smartphone attached to the vehicle. In this case, there is no need for an accelerometer to be provided within the display panel, as virtually all smartphones comprise an accelerometer that can be connected to the receiver, whether wired or wirelessly, and be exploited for the purpose of the invention. If a smartphone is affixed to the vehicle, such as by being attached onto the vehicle dashboard, the smartphone will be able to move in tandem with the vehicle and detect the acceleration of the vehicle, and provide the display panel with information of the vehicle speed.

Alternatively, display panel is configured to be physically connected to a smartphone Preferably, the display panel further comprises a wireless transceiver for receiving contents for display. This provides the possibility of sending advertisements from a server to the display panel wirelessly, allowing remote updating of advertisements instead of relying on content pre-stored in the memory of the display panel.

Optionally, the display panel further comprises a second-screen arranged to face a direction different from the direction which the screen faces. A two-screen configuration allows greater reach to pedestrians on both banks of a road. It is possible that the display on one screen is different from the display on the other screen, albeit that both screens show contents which are selected based on the speed in which the display panel is moving.

Preferably, however, the display panel is a single-screen display panel, and the display panel is configured such that the screen is facing the side of the road proximate the slow lane. This feature allows the display panel to display information to other vehicles only on one side of the vehicle, so that drivers of vehicles in the faster lanes are not subject to distraction from screen displays. In this way, the embodiment is able to maximise pedestrian viewership at the bank of the road, while improving safety concerns with regards to possible distraction of drivers in the fast lane.

In a second aspect, the invention proposes a vehicle comprising a display panel, the display panel being responsive to the speed of the vehicle to vary the content displayed on the display panel. Typically, the display panel is positioned such that content shown on the display is visible to people outside the vehicle.

This provides that vehicles can be made integral with the display panel. As mentioned before, the display panel is configured to be capable of displaying a sequence of contents, the display panel being responsive to the speed of the vehicle to vary the interval, i.e. display time, of each content in the sequence of contents.

In a third aspect, the invention proposes a method of determining the length of intervals in a sequence of contents in a display panel comprising the steps of: providing the display panel, the display panel configured to be capable of displaying a sequence of contents in intervals, detecting the speed in which the display panel is moving; shortening the intervals between successive contents in the sequence if the speed is slower than a pre-determined threshold; and lengthening the intervals between successive contents in the sequence if the speed is faster than a pre-determined threshold.

Preferably, the method further comprises a step of displaying no content if the speed is faster than a second pre-determined threshold.

Preferably, the speed in which the screen is moving is monitored by an accelerometer or a smartphone moving in tandem with the display panel, or by a Global Positioning System In a further aspect, the invention proposes a display panel comprising a screen, the display panel configured to display content on the screen; wherein the display panel is responsive to the speed limit of the location where the display panel is in to vary the content displayed on the screen. This provides a possibility that content displayed in the display panel on the vehicle remains the same despite the display panel changing speed, for as long as the vehicle is within the same speed-limited zone.

In yet a further aspect, the invention proposes a vehicle comprising: a display panel; wherein the display panel is responsive to the speed limit of the location where the display panel is in to vary the content displayed on the screen.

In yet another further aspect, the invention proposes a method of determining length of intervals in a sequence of contents in a display panel comprising the steps of: providing the display panel, the display panel configured to be capable of displaying the sequence of contents in intervals, detecting the speed limit of the locality in which the display panel is in; shortening the intervals between successive contents in the sequence if the speed is limit is lower than a pre-determined threshold; and lengthening the intervals between successive contents in the sequence if the speed limit is higher than a pre-determined threshold.

BRIEF DESCRIPTION OF THE FIGURES

It will be convenient to further describe the present invention with respect to the accompanying drawings that illustrate possible arrangements of the invention, in which like integers refer to like parts. Other arrangements of the invention are possible, and consequently the particularity of the accompanying drawings is not to be understood as superseding the generality of the preceding description of the invention.

DETAILED DESCRIPTION OF SPECIFIC EMBODIMENTS

Figure 1:
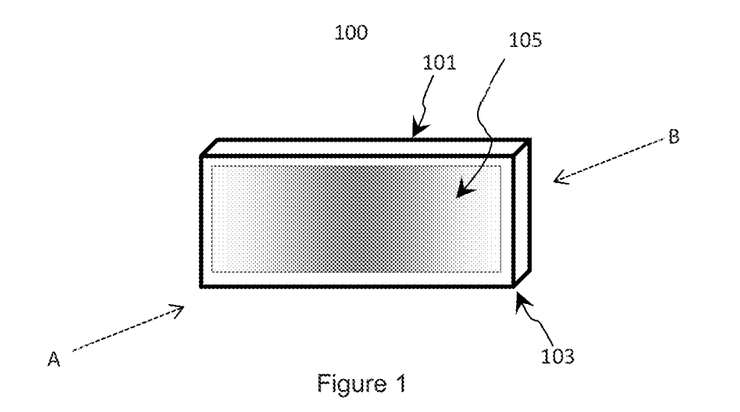
FIG. 1 illustrates a first embodiment.

FIG. 1 is a schematic illustration of a display panel 100 according to an embodiment of the invention. The display panel 100 is configured to be capable of being installed onto a vehicle.

The display panel 100 comprises a housing 101 having a screen 105. The housing 101 has a narrow and elongate, rectangular base 103. The body of the housing 101 extends from the base 103 upwardly, to provide a rectangular façade along the side of the base 103. On the rectangular façade is installed the screen 105, visible from the direction of arrow A in the drawing, which is capable of displaying digital images. Typically, the screen 105 is a light-emitting diodes display (LED) or a liquid-crystal display (LCD). The housing 101 protects the screen 105 from weathering elements.

Figure 2:
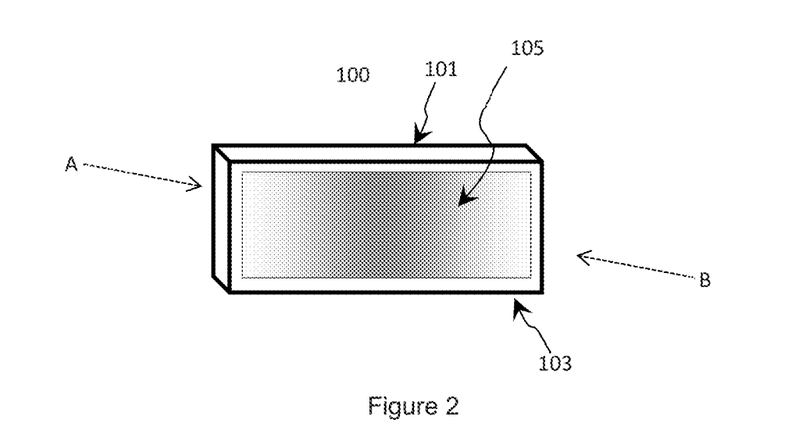
FIG. 2 illustrates the reverse side of the embodiment of FIG. 1.

Preferably, the side of the housing 101 facing away from the screen 105, as viewed from direction of arrow B, also has a screen, i.e. a second screen in the housing. The opposite or reverse view to that shown in FIG. 1 is shown in FIG. 2. Such a two-screen display panel 100 is capable of displaying information on both sides of the housing 101.

Figure 3:
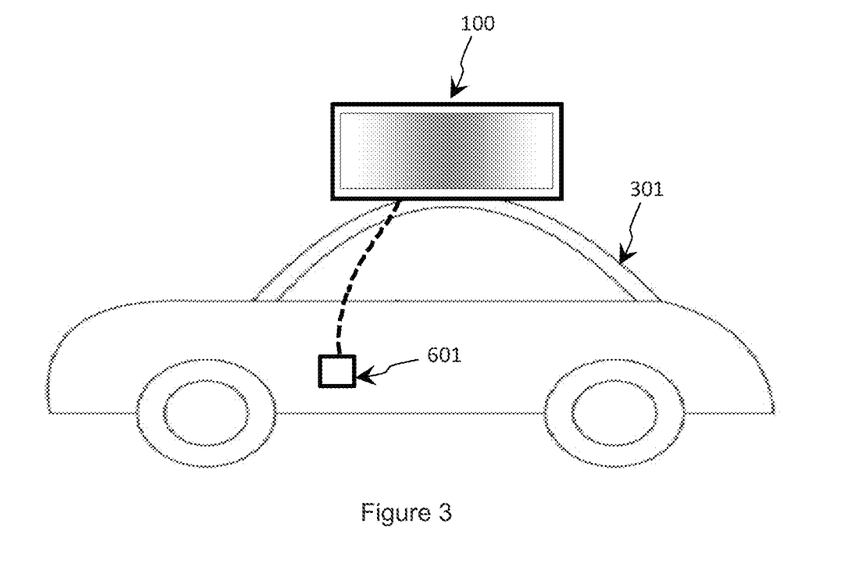
FIG. 3 shows the embodiment of FIG. 1 mounted to the top of a vehicle.

FIG. 3 shows the display panel 100 mounted on a vehicle 301. Typically, the display panel 100 is used to display advertisements. Therefore, the vehicle 301 is preferably a taxi, since taxis travel continually and randomly throughout their given locality, possibly increasing the reach of advertisements shown on the display panel 100.

Figure 4:
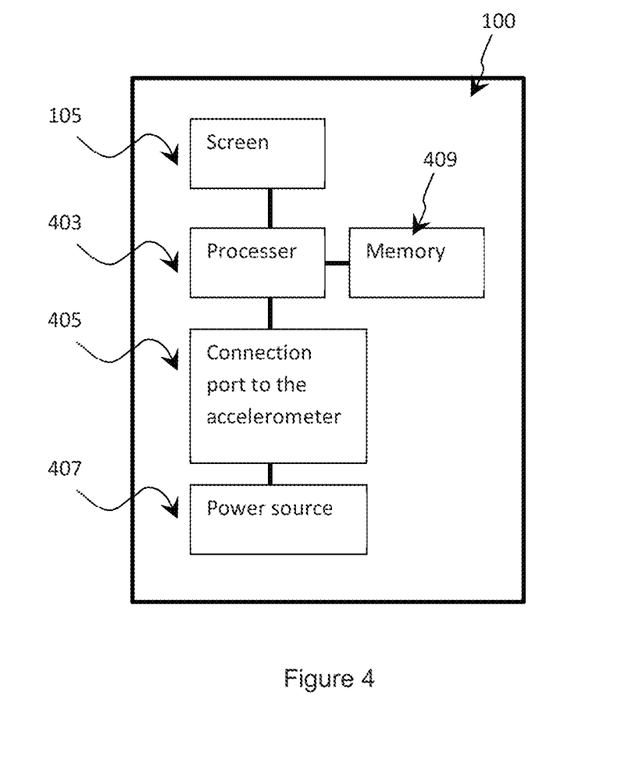
FIG. 4 is a schematic diagram of some of the components in the embodiment of FIG. 1.

FIG. 4 illustrates a schematic diagram of some of the components in the display panel 100. Besides the screen 105, the display panel 100 comprises built-in computer or a processor 403 of any suitable type, a power source 407, a connection socket 405 to receive acceleration information from an accelerometer 601, and memory 409.

The processor 403 operates the display panel 100, and may contain a piece of firmware. The processor 403 is able to extract and process information from the memory 409 to display the information on the screen 105.

The information which the processor 403 draws from the memory 409 is typically a plurality of advertisement contents. When the display panel 100 is in operation, the processor 403 causes the advertisement contents to be displayed on the screen 105 one after another, sequentially, with a period of time or an interval between every two successive advertisements. While on display during its interval, a displayed advertisement may be read by a pedestrian.

Alternatively, instead of having a built-in processor 403 to process the information, the screen 105 is linked to an external processing device through hard wiring. An example of an external processing device is a smartphone. As the skilled reader knows, a smartphone is a handheld personal computer which also functions as a portable, wireless telephone. Information which needs to be displayed on the screen 105 or any logic decision relating to screen display is processed by the computational functions of the smartphone.

The illustrated power source 407 is possibly just a connection port for electric power to operate the display panel 100. Electric power may be generated and supplied by the vehicle 301, such as in the case where the vehicle 301 comprises an engine which operates on fossil fuel. Alternatively, if the vehicle 301 is an electric vehicle, the electric power is simply supplied by the battery of the vehicle 301.

In a variation of the embodiment, the power source 407 is a battery which is installed into the housing 101 of the display panel 100. Preferably, the battery is rechargeable, in which case the battery can be removed for charging and then replaced into the housing 101. Alternatively, the battery is rechargeable wirelessly by induction, and removal of the battery for charging is not required.

The vehicle 301 to which the display panel 100 is mounted is installed with an accelerometer 601 which measures acceleration to determine the velocity of the vehicle 301. Typically, the accelerometer 601 is installed in some part of the vehicle 301 which is inconspicuous, such as the bonnet, the boot or the dashboard. The preferred type of accelerometer 601 is a three-axis accelerometer, although a two-axis or a mono-axial accelerometer may be used as long as the speed of the vehicle 301 travelling forward can be monitored. The accelerometer 601 could be based on capacitive, piezoresistive, magnetoresistive or piezoelectric effect, or operate based on the Hall effect.

The connection socket 405 to the accelerometer 601 can be connected with a cable from the accelerometer 601, so that the display panel 100 is able to receive acceleration information of the vehicle 301.

In order for an advertisement to be effective, there must be sufficient time for a person looking the advertisement to comprehend or take in the advertisement message. Therefore, there must be a suitably interval long between each change of advertisement content. However, the interval is variable in the embodiment. The acceleration information received from the accelerometer 601 is used by the processor 403 to determine how often or how quickly to change the advertisement on the screen 105, thereby varying the length of the intervals between changes of advertisement contents.

Generally, the eyes of a person are able to follow the display of a slow moving display panel 100 more easily than to follow that shown on a fast moving display panel 100. Therefore, if the vehicle 301 is moving slowly, or if the vehicle is parked and stationary, there is greater likelihood that a person near the display panel 100 is able to be informed of the message of the advertisement quickly. Accordingly, the processor 403 shortens the intervals between the sequence of advertisements, causing the advertisements to change more quickly.

If the vehicle 301 is moving fast, however, there is little point in changing the advertisement quickly. Firstly, any person reading an advertisement is less likely to see the next advertisement, as the vehicle 301 may have moved away before the next advertisement is displayed. This reduces the effectiveness of the advertisements. Furthermore, it is difficult for any person to read an advertisement on a moving panel. Therefore, if the vehicle 301 is moving quickly, the processor 403 lengthens the interval between different advertisements on the screen 105, causing the advertisements to change more slowly, to improve the reception of the advertisements.

A preferred speed threshold is not specified here, nor a specific period of time for the interval in response to a speed threshold, because these depend on the complexity of the advertisement or the length of time for playing an advertisement (if the advertisement comprises a video clip). The type of advertisements, the optimum speed thresholds, and advertisement change intervals may be decided by the operators managing and using the embodiments in actual situations.

The embodiment provides an additional advantage. A slower change of advertisements is less likely to become a source of distraction to vehicles which are in the neighbouring lanes of the road. This is an advantage particularly important on the highways or expressways, where less distraction to the neighbouring drivers is desirable. In other words, the present embodiment is able to make and detect that the vehicle 301 is travelling on the highway by observing the speed of vehicle 301, and then reducing the rate of change of advertisements.

Figure 5:
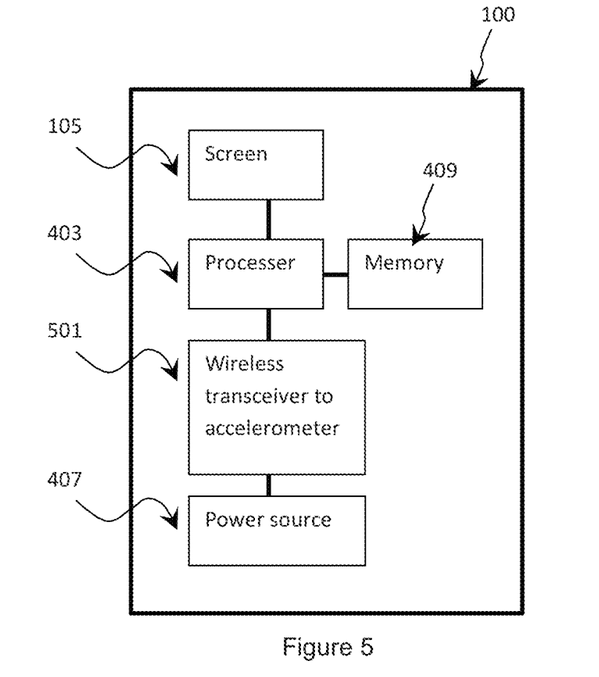
FIG. 5 is a variation of the schematic diagram of FIG. 4.

Optionally, if the vehicle 301 is moving faster than an even higher speed threshold, i.e. a second threshold, the display panel 100 switches off the screen and does not show any content at all. Besides reducing distraction to neighbouring drivers, switching off the display conserves energy when it is ineffective to display advertisements, either because the vehicle is passing by the pedestrian too quickly or the vehicle is on a highway with few pedestrians FIG. 5 illustrates a schematic diagram of the components in the display panel 100 which comprise a variation of the embodiment of FIG. 4, wherein a wireless transceiver 501 is in the place of the connection socket 405. In this case, the communication of acceleration information from the accelerometer 601 to the display panel 100 is wireless.

Figure 6:
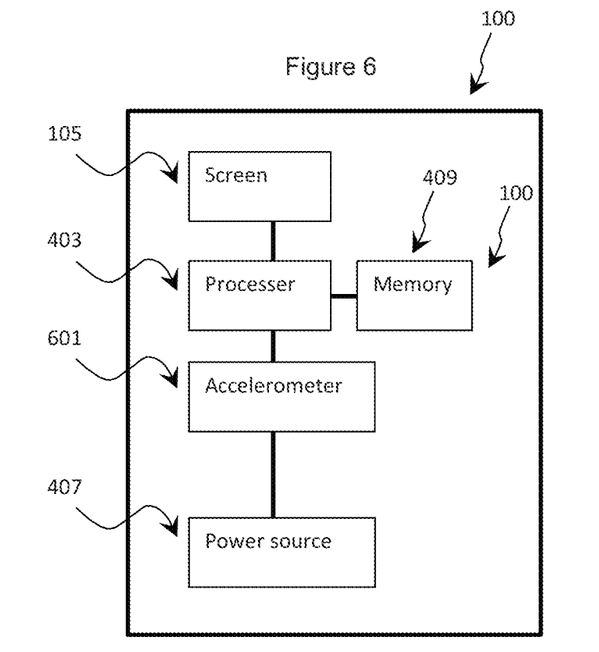
FIG. 6 is another variation of the schematic diagram of FIG. 4.

FIG. 6 illustrates a schematic diagram of the components in the display panel 100 of another embodiment. In this embodiment, there is no connection socket 405. Instead, an accelerometer 601 is built into or installed into the display panel 100. Advantageously, in this embodiment, the display panel 100 does not require an external accelerometer to be installed into the vehicle 301. The display panel 100 can simply be bought as a whole from the supplier as an integrated device and mounted onto the vehicle 301, and movements of the vehicle 301 can be sensed by the accelerometer 601 in the display panel 100.

Figure 7:
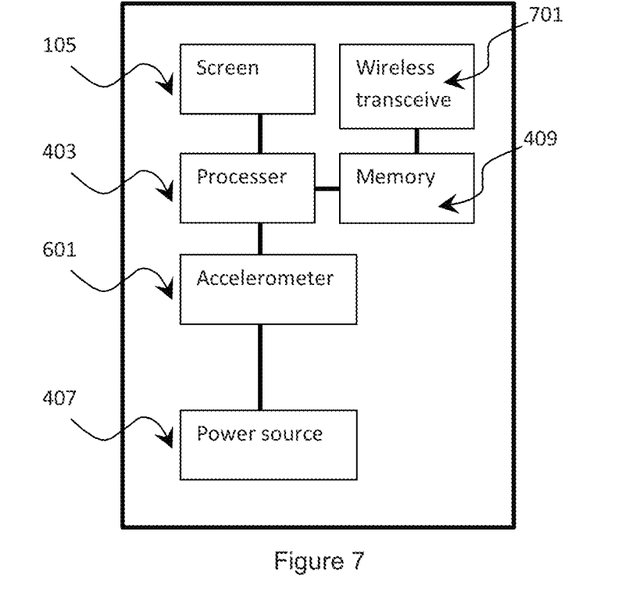
FIG. 7 is another variation of the schematic diagram of FIG. 4.

FIG. 7 illustrates a schematic diagram of the components in the display panel 100 of yet another embodiment. A wireless transceiver 701 is provided in the display panel 100 (not the same as the wireless transceiver 501 to the accelerometer). Advertisements are not stored in the memory 409 in the display panel 100. Instead, advertisements are transmitted to the display panel 100 wirelessly by a remote server to be displayed on the screen 105 immediately. If the vehicle 301 is moving slowly, the processer 403 requests the server for new advertisements more quickly. If the vehicle 301 is moving quickly, the processer 403 requests the server for a new advertisement more slowly.

Figure 10:
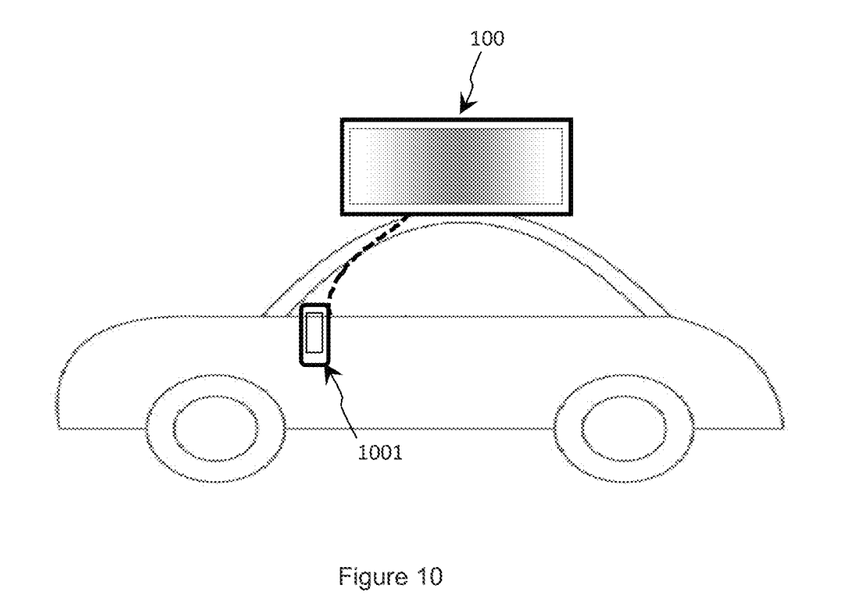
FIG. 10 shows a variation of the embodiment of FIG. 1 installed to a vehicle.

FIG. 10 shows another a variation of the embodiment of FIG. 1, wherein the accelerometer 601 attached to the vehicle 301 is replaced by a smartphone 1001, and the smartphone 1001 comprises an accelerometer 601 for detecting movements of the smartphone 1001. Therefore, by affixing the smartphone 1001 to the vehicle 301, the smartphone 1001 is able to detect the speed of the vehicle 301, and supply acceleration information to the display panel 100. Alternatively, instead of an accelerometer 601, the smartphone 1001 may also detect speed by other competing technologies, such as using Global Positioning System (GPS) to monitor movements of the smartphone 1001 and speed of the movements. In an embodiment, a suitable smartphone 1001 app (software application) is provided in the smartphone 1001 for communicating with the display panel 100, to control the processor 403 in the display panel 100 and/or uploading advertisement information from a memory in the smartphone 1001 into the memory 409 in the display panel 100.

The smartphone 1001 can also be used to download new advertisement content from a remote server, so that that smartphone 1001 can in turn upload the new advertisement content into the memory 409 for immediate display. Communication between the smartphone and the display panel can be via a cable or it can be wireless, such as by Bluetooth™.

Figure 11:
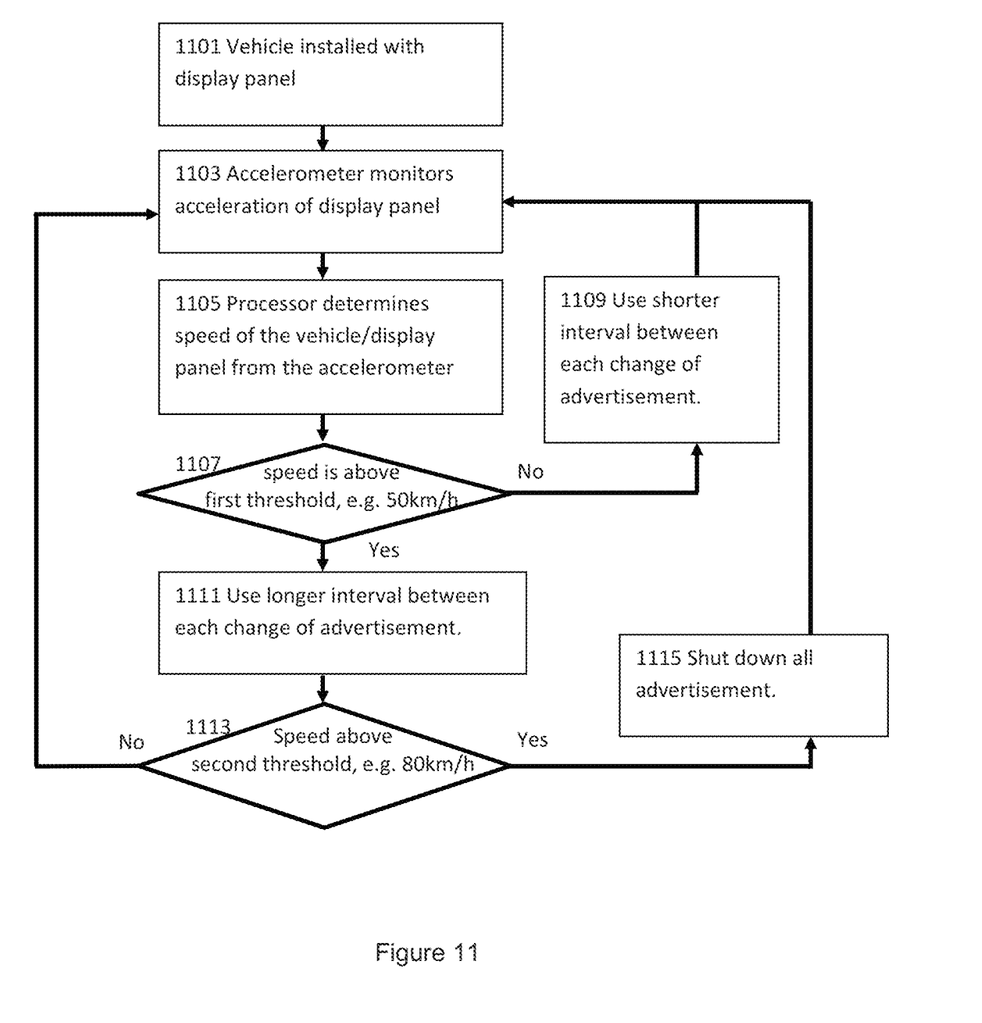
FIG. 11 is a flowchart showing the operation in the embodiment of FIG. 1.

FIG. 11 is a flowchart of one possibility of the decision making process of the processor 403.

In step 1101, a vehicle 301 is first installed with one of the embodiments of the invention. In step 1103, the accelerometer 601 (be it an integral part of the display panel 100, connected by cable, wireless or otherwise) which is somehow affixed to the vehicle 301 detects acceleration of the vehicle 301.

In step 1105, the processor 403 obtains the acceleration information and determines, at step 1107, the speed at which the vehicle 301 is moving. If the speed is lower than a predetermined threshold, then, at step 1109, a shorter interval is applied between every change of advertisement content, and the accelerometer 601 continues to monitor acceleration again, at step 1103. If not, at step 1111, a longer interval is applied between every change of advertisement content.

In step 1113, the processor 403 checks if the speed is also higher than a second threshold. If not, the routine then returns to the accelerometer 601 to continue monitoring the acceleration of the vehicle 301, at step 1103. If so, the processor 403 shuts down the screen on the display panel 100, at step 1115.

The routine then returns to the accelerometer 601 to continue monitoring the acceleration of the vehicle 301, at step 1103.

In some embodiments, step 1113 and step 1115 are not implemented, as advertisements are displayed at all times.

Figure 12:
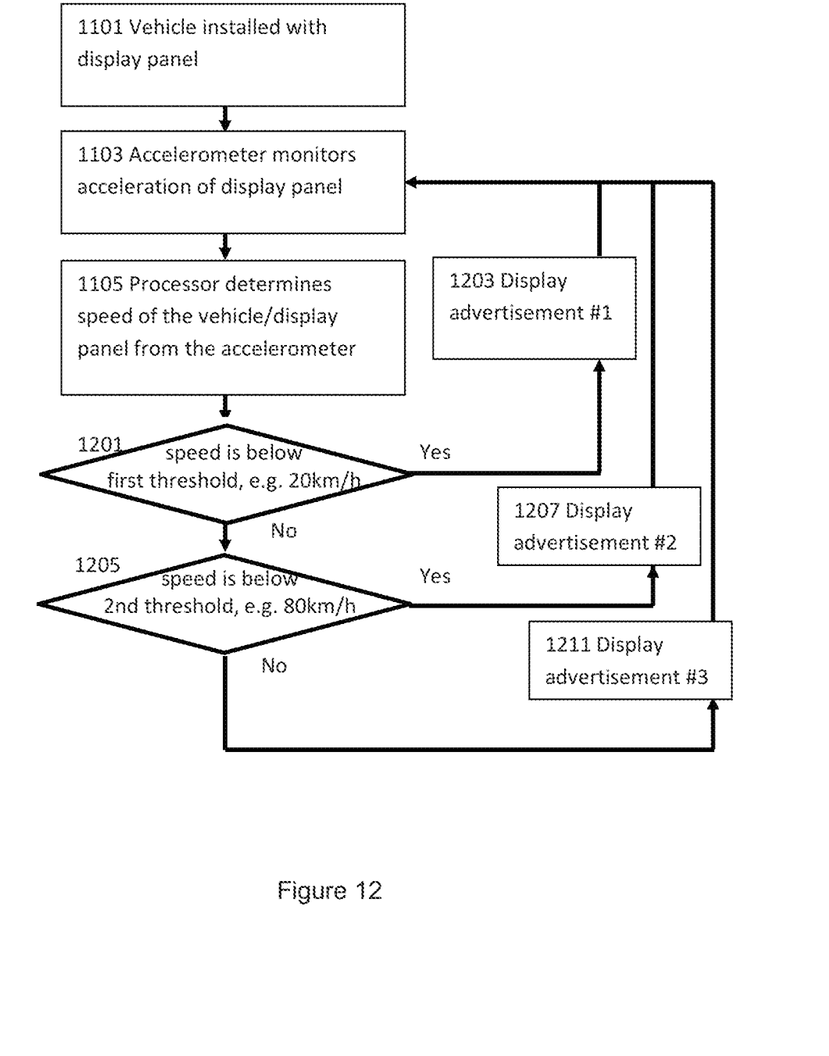
FIG. 12 is a flowchart showing yet another operation in the embodiment of FIG. 1.

In a variation of the embodiment of FIG. 11, as illustrated in the flowchart of FIG. 12, the speed of the vehicle does not affect the interval between the advertisements. Instead, the speed of the vehicle determines which advertisement or which type of advertisement to show, i.e. the speed is a factor in content selection. For example, after the steps of installing the vehicle with the display panel 100, at step 1101, and monitoring the speed of the vehicle, at step 1103 and step 1105, the processor checks from the information provided by the accelerometer at step 1201 whether the vehicle is travelling at a relatively slow speed, below a first speed threshold. If so, the processor then causes a predetermined advertisement to be displayed, at step 1203. The specific advertisement is indicated as #1 in the flowchart.

If the speed of the vehicle is not lower than the first speed threshold, the processor then checks from the information provided by the accelerometer 601 whether the vehicle 301 is travelling at a speed above the first threshold and below the second speed threshold, at step 1205. If so, the processor 403 then causes another pre-determined advertisement to be displayed, at step 1207. The specific advertisement is indicated as #2 in the flowchart.

However, if the speed of the vehicle is not lower than the second speed threshold, the processor then causes yet another pre-determined advertisement to be displayed, at step 1211. The specific advertisement is indicated as #3 in the flowchart.

An example of the first speed threshold is 20 km/h. That means, if the vehicle is travelling at 0-20 km/h, a certain advertisement which may benefit from more prolonged viewer concentration may be shown. It could be an advertisement with a lot of details, such as advertisement of an insurance company, i.e. advertisement #1.

If the second threshold is 80 km/h and if the vehicle is travelling at between 21-80 km/h, an advertisement which relies more on imagery and therefore easier for viewer to absorb may be shown. This could be a food and beverage advertisement, such as a beer advertisement, i.e. advertisement #2.

On the other hand, if the vehicle is travelling at 81 km/h or above, an advertisement which can be read very quickly including national emergency information may be shown, i.e. advertisement #3.

Figure 8:
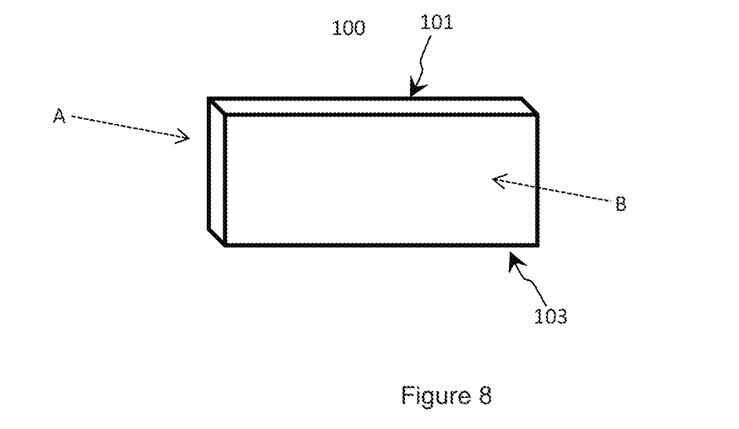
FIG. 8 shows a variation to the embodiment of FIG. 1.

FIG. 8 shows a variation to the embodiment of FIG. 1 and FIG. 2. The reverse side of the display panel 100, from the point of view of arrow B, corresponding to the same side as shown in FIG. 2. However, there is no screen 105. The embodiment of FIG. 8 is a single screen display panel 100. When the display panel 100 of FIG. 8 is mounted on a vehicle 301, the side of the display panel 100 having a screen 105 is positioned to face the bank of the road proximate the slow lane. Hence, there is no screen for providing a display to drivers in the neighbouring fast lane. This embodiment is safer to remain in use when the vehicle 301 is travelling on the highway, as the drivers of vehicles in the faster lanes are not exposed to distraction of changing advertisements. Furthermore, the usage of energy is less than that of the embodiment of FIG. 1, since there is one screen less. In addition, this embodiment is suitable for installation on the side of a large vehicle, such as a bus.

Figure 9:
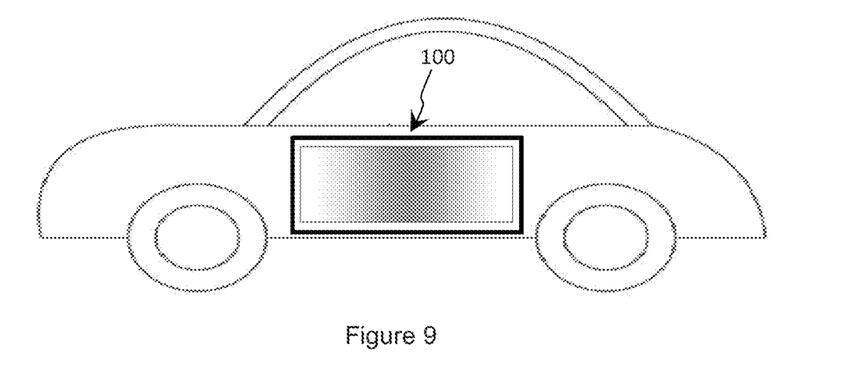
FIG. 9 shows the embodiment of FIG. 8 installed to a vehicle.

FIG. 9 shows how the embodiment of FIG. 8 may be deployed on the side of a vehicle 301. Although a car is illustrated, the vehicle 301 may be a bus or coach, or even a train carriage, having a side large enough for a one-screen display panel 100 to be installed onto.

Therefore, the described embodiments include a display panel 100 comprising a screen 105 installed onto the housing, the display panel 100 is configured to display content on the screen 105; wherein the display panel 100 is responsive to the speed in which the display panel 100 is moving to vary the content displayed on the screen 105.

The described embodiments also include a vehicle 301 comprising: a display panel 100, the display panel 100 being responsive to the speed of the vehicle 301 to vary the content displayed on the display panel 100.

Furthermore, the embodiments include a method of determining the length of intervals in a sequence of contents in a display panel 100 comprising the steps of: providing the display panel 100, the display panel 100 configured to be capable of displaying a sequence of contents in intervals, detecting the speed in which the display panel 100 is moving; shortening the intervals between successive contents in the sequence if the speed is slower than a pre-determined threshold; and lengthening the intervals between successive contents in the sequence if the speed is faster than a pre-determined threshold.

Figure 14:
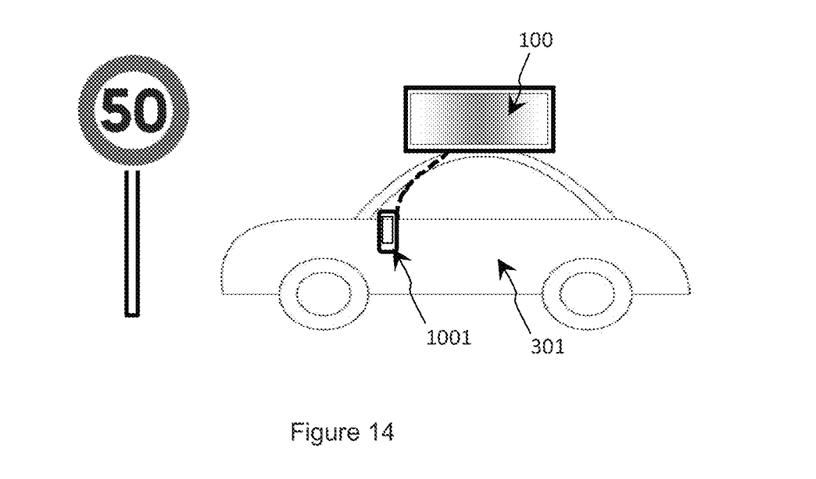
FIG. 14 illustrates yet another embodiment.

FIG. 14 shows a further embodiment, in which the display panel 100 mounted on the vehicle is responsive to the speed limit of the road instead of the actual speed in which the vehicle 301 is travelling in.

Figure 13:
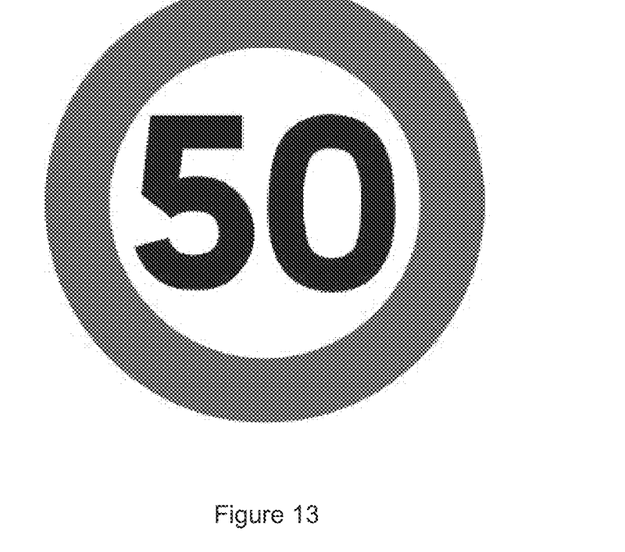
FIG. 13 illustrates a road sign to which the embodiment of FIG. 14 is responsive.

Speed limit can be detected using image recognition of road signs. An example of a road sign showing a speed limit is given in FIG. 13. The unit used for measuring speed is uniform in any given jurisdiction, and it is normally kilometres for countries like Hong Kong and miles for countries like the United Kingdom. Alternatively, the speed limit of a particular stretch of road can be identified by Global Positioning System (GPS). The GPS positioning of a vehicle in small jurisdictions like Hong Kong, Singapore and most of the high-dense cities is highly accurate. Speed limit can be determined using GPS as most major map applications have licensed data from third-party companies, allowing users to determine speed limit on specific roads.

Accordingly, the processor in the display panel 100 varies the rate of change of display content based on the speed limit of the locality where the vehicle is. In certain pre-determined locations where the speed limit is very high, the display panel 100 switches the screen 105 off.

Figure 15:
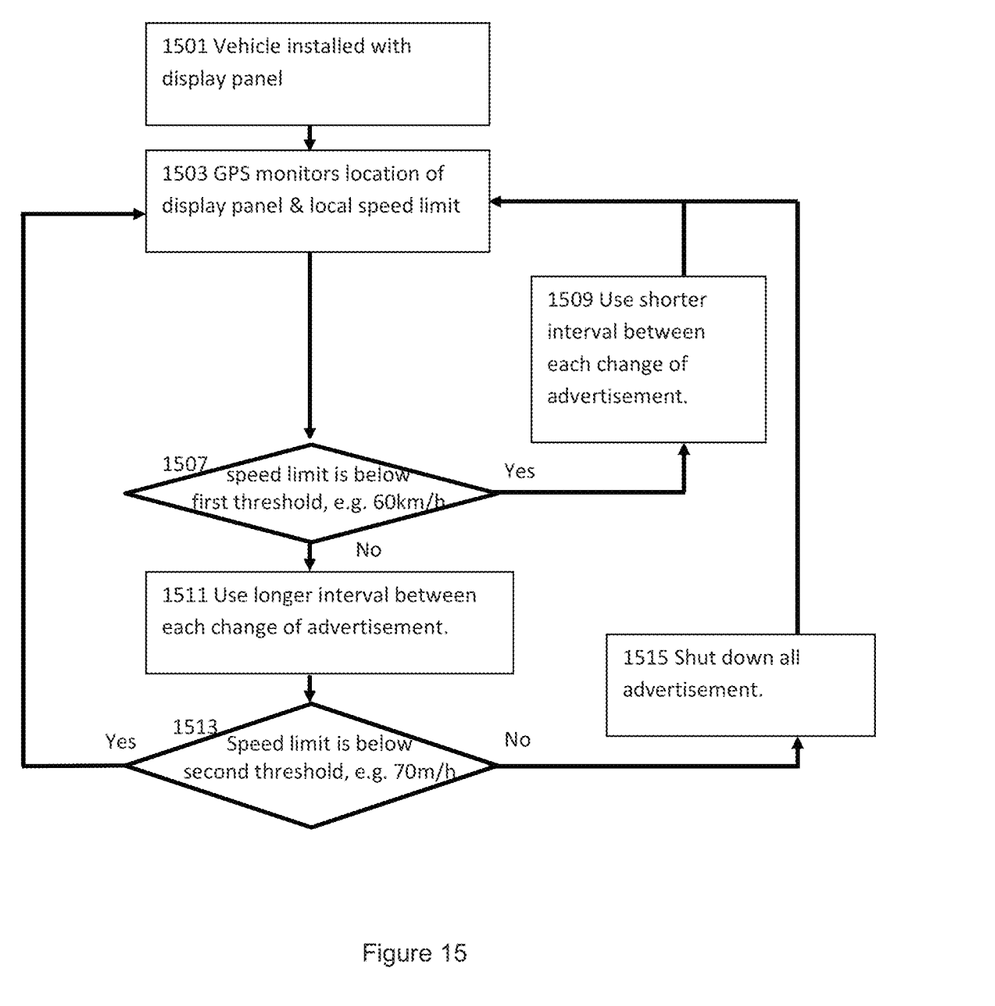
FIG. 15 is a flowchart showing the operation in the embodiment of FIG. 14.

FIG. 15 is a flowchart illustrating how speed limit of an area can be used to determine the rate of change of the advertisements shown on the display panel 100. At first, the vehicle 301 has to be installed with a display panel 100, at step 1501. Subsequently, the location of the vehicle 301 is monitored by GPS, at step 1503.

The GPS location of the vehicle 301 can be matched to databases to obtain the speed limit of the location.

The display panel 100 itself can be installed with a GPS system to detect the location of the display panel 100. Alternatively, a smartphone 1001, which is connected to the display panel 100 allows GPS detection of the display panel 100. Smartphones, as the skilled reader understands, already comprise GPS functions for locating the smartphones, and may be used for this embodiment.

If it is detected that the speed limit of the location is below a certain threshold, which means the vehicle 301 is travelling relatively slowly, then, at step 1509, a shorter interval is applied between every change of advertisement content. If not, and the speed limit of the location is above a certain threshold, a longer interval is applied between every change of advertisement content, at step 1511.

In step 1513, the processor 403 checks if the speed is also higher than a second threshold. If so, the processor 403 shuts down the screen on the display panel 100, at step 1515. If not, the flow returns to monitoring the GPS location of the display monitor 100, at step 1503.

Figure 16:
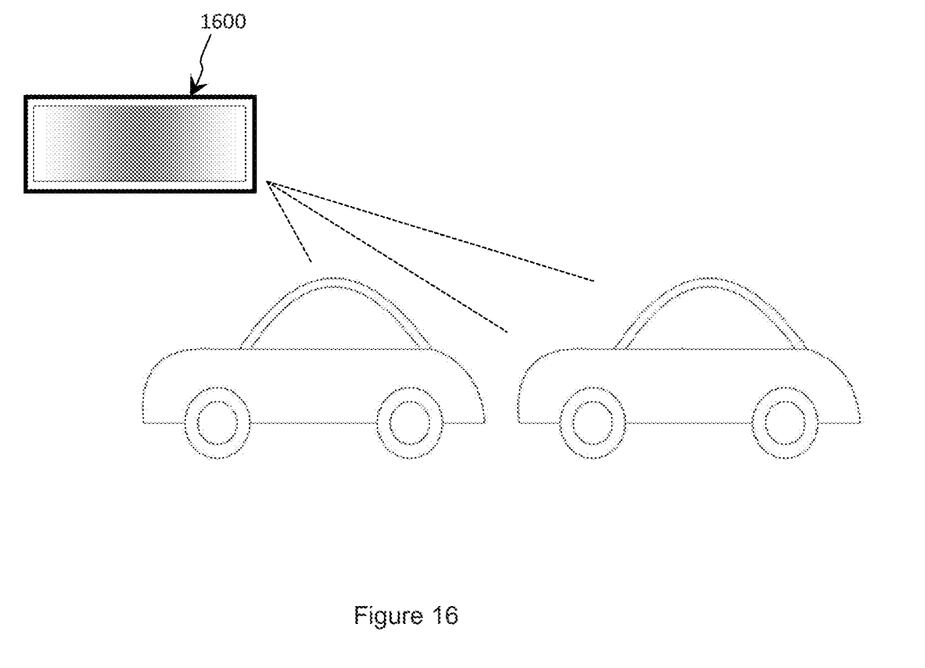
FIG. 16 illustrates yet another embodiment.

FIG. 16 shows yet another embodiment, which is a stationary display panel 1600 fixed to a location beside a road. The target audience for advertisement shown in this embodiment includes both pedestrians and drivers. The fixture can be to a wall, a pillar or on the body of a bridge (not illustrated). The average speed of the moving vehicles can be detected by a sensor in the screen. The sensor can be a radar speed gun, or composed of a camera and image processing software to identify the speed of moving vehicles. Vehicle speed sensing technology is well known and does not require introduction here. The contents on the display panel 1400 change in a frequency which is inversely proportional to the average speed of the traffic in the particular road. The average speed of traffic can be easily obtained from the relevant public traffic department, and most countries are able to provide this information in real time. In a traffic congestion, the stationary display panel 1400 shows a faster change of advertisement as the drivers are unlikely to be completely focused to the vehicle in front which is moving at a very slow speed. When the vehicles are moving quickly, the display panel 1400 shows a slower change of advertisement so that drivers are unlikely to be distracted by the flicker of content change.

Accordingly, the embodiments also include a display panel comprising a screen, the display panel configured to display content on the screen; wherein the display panel is responsive to the speed limit of the location where the display panel is in to vary the content displayed on the screen.

By 'vehicle', the skilled reader shall understand that cars, trucks, buses, coaches, trains, lorries and any other form of automobile running on land which is capable of bearing messages such as and including advertisement are within contemplation, as well as manually pulled vehicles such as carts, burrows and carriages.

Although 'interval' has been used to describe the time between different advertisements, and that there is a constant interval between all the advertisements shown on the panel, it is also possible that there is a different interval between different advertisements, in which case, lengthening or shortening the intervals between the advertisements is a matter of percentage of the intervals. For example, a beer advertisement may be shown for 5 seconds (the interval) before the next advertisement for a piece of property may be shown for 15 seconds (another interval), and the next advertisement may be for perfume to be shown for 10 seconds. A reduction in speed will case the intervals to be shorten by 20%, and the beer advertisement may be shown for 4 seconds (the interval) before the next advertisement for a piece of property may be shown for 12 seconds (another interval), and the next advertisement may be for perfume to be shown for 8 seconds. Alternatively, if the vehicle has sped up instead or slow down, the increase in speed will case the intervals to be lengthened by 20%, and the beer advertisement may be shown for 6 seconds (the interval) before the next advertisement for a piece of property may be shown for 18 seconds (another interval), and the next advertisement may be for perfume to be shown for 12 seconds.

Where 'speed' or 'acceleration' has been mentioned, the skilled reader knows that these two can be converted into the other mathematically, and are able to replace one the other in a practical situation.

While there has been described in the foregoing description preferred embodiments of the present invention, it will be understood by those skilled in the technology concerned that many variations or modifications in details of design, construction or operation may be made without departing from the scope of the present invention as claimed.

For example, if the vehicle 301 is moving above a certain speed or above the speed limit, the display panel 100 shows an alert that may be observed by the public, including the traffic police, such as a display of solid red colour. This can help in emergency cases, such as when the driver is delivering a passenger to the hospital.

Although an accelerometer 601 has been described, the skilled reader understands that other devices or technology for determining the speed in which the screen 105 is moving is within the contemplation of the invention. For example, although the Global Positioning System is too imprecise for monitoring the speed of a vehicle 301, it is nevertheless possible to be used in some of the embodiments for estimating the speed of the vehicle 301 and hence causing the display panel 100 to change display content in suitable intervals.

The invention claimed is:

1. A display panel comprising
a screen, the display panel configured to display content on the screen;
wherein
the display panel is responsive to the speed in which the display panel is moving to vary the content displayed on the screen;
the display panel being configured to display a plurality of contents on the screen in intervals; and
the display panel being configured to respond to the speed to vary the length of the intervals between successive displays of the plurality of contents.

2. A display panel as claimed in claim 1, further comprising an integral accelerometer.

3. A display panel as claimed in claim 1, wherein
the display panel is configured to receive from a smartphone information on the speed in which the display panel is moving.

4. A display panel as claimed in claim 3, wherein
display panel is configured to be physically connected to a smartphone.

5. A display panel as claimed in claim 1, wherein
the display panel further comprises a wireless transceiver for receiving display content.

6. A display panel as claimed in claim 1, wherein
the display panel further comprises a second-screen arranged to face a direction different from the direction which the screen faces.

7. A display panel as claimed in claim 1, wherein the screen is configured to be mounted to the top of a vehicle or to the side of a vehicle.

8. A method of determining the length of intervals in a sequence of contents in a display panel comprising the steps of:
providing the display panel, the display panel configured to be capable of displaying a sequence of contents in intervals,
detecting the speed in which the display panel is moving;
shortening the intervals between successive contents in the sequence if the speed is slower than a pre-determined threshold; and
lengthening the intervals between successive contents in the sequence if the speed is faster than a pre-determined threshold.

9. A method of determining the display intervals between a sequence of contents in a display panel as claimed in claim 8, wherein
the display panel is affixed to a vehicle to be visible to a person outside the vehicle.

10. A method of determining the length of intervals in a sequence of contents in a display panel as claimed in claim 9, wherein
display panel is affixed to the top of a vehicle or the side of a vehicle.

11. A method of determining the display intervals between a sequence of content in a display panel, as claimed in claim 9, further comprising the step of:
displaying no content if the speed is faster than a second pre-determined threshold.

12. A method of determining the display intervals between a sequence of content in a display panel, as claimed in claim 9, wherein
the speed in which the screen is moving is monitored by an accelerometer or a smartphone moving in tandem with the display panel, or by a Global Positioning System.

13. A method of determining length of intervals in a sequence of contents in a display panel comprising the steps of:
providing the display panel, the display panel configured to be capable of displaying the sequence of contents in intervals,
detecting the speed limit of the locality in which the display panel is in;
shortening the intervals between successive contents in the sequence if the speed limit is lower than a pre-determined threshold; and
lengthening the intervals between successive contents in the sequence if the speed limit is higher than a pre-determined threshold.

* * * * *